US011923104B2

(12) United States Patent
Huang et al.

(10) Patent No.: US 11,923,104 B2
(45) Date of Patent: Mar. 5, 2024

(54) CABLE

(71) Applicant: Hitachi Metals, Ltd., Tokyo (JP)

(72) Inventors: Detian Huang, Tokyo (JP); Yoshinori Tsukamoto, Tokyo (JP); Masanori Kobayashi, Tokyo (JP); Masashi Moriyama, Tokyo (JP); Koji Fukuzato, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 0 days.

(21) Appl. No.: 17/468,054

(22) Filed: Sep. 7, 2021

(65) Prior Publication Data

US 2022/0084724 A1 Mar. 17, 2022

(30) Foreign Application Priority Data

Sep. 15, 2020 (JP) ................................ 2020-154344

(51) Int. Cl.

| | |
|---|---|
| ***H01B 11/06*** | (2006.01) |
| ***H01B 7/18*** | (2006.01) |
| ***H01B 7/22*** | (2006.01) |
| ***H01B 11/18*** | (2006.01) |
| ***H01B 11/20*** | (2006.01) |

(52) U.S. Cl.

CPC ........... *H01B 11/20* (2013.01); *H01B 7/1865* (2013.01); *H01B 7/22* (2013.01); *H01B 11/1808* (2013.01)

(58) Field of Classification Search

CPC ...................................................... H01B 11/06

See application file for complete search history.

(56) References Cited

U.S. PATENT DOCUMENTS

| | | | | |
|---|---|---|---|---|
| 2,924,141 A * | 2/1960 | Kinniburgh | H01B 9/024 | 87/9 |
| 3,087,699 A * | 4/1963 | Foster | D03D 25/00 | 428/109 |
| 3,594,491 A * | 7/1971 | Zeidlhack | H01B 11/1808 | 174/102 R |
| 5,414,211 A * | 5/1995 | Chan | H01B 11/1033 | 174/109 |
| 6,674,010 B2 * | 1/2004 | Inui | H01B 11/06 | 174/113 C |

(Continued)

FOREIGN PATENT DOCUMENTS

| | | |
|---|---|---|
| JP | H06-080216 U | 11/1994 |
| JP | 2007-023305 * | 2/2007 |

(Continued)

OTHER PUBLICATIONS

Japanese Office Action dated Oct. 17, 2023, in corresponding Japanese Patent Application No. 2020-154344, and English translation thereof.

*Primary Examiner* — Chau N Nguyen

(74) *Attorney, Agent, or Firm* — MCGINN I.P. LAW GROUP, PLLC.

(57) ABSTRACT

A cable includes a cable core including one or more electric wires, a shield layer covering around the cable core, and a sheath covering around the shield layer. The shield layer is composed of a braided shield including a plurality of first metal wires composed of aluminum or aluminum alloy and a plurality of second metal wires composed of copper or copper alloy. The plurality of first metal wires and the plurality of second metal wires are cross-braided.

16 Claims, 1 Drawing Sheet

(56) References Cited

U.S. PATENT DOCUMENTS

| | | | | |
|---|---|---|---|---|
| 7,208,683 | B2 * | 4/2007 | Clark | H01B 11/04<br>174/27 |
| 7,495,176 | B2 * | 2/2009 | Winkelbauer | H01B 7/182<br>174/113 C |
| 7,674,973 | B2 * | 3/2010 | Cardas | H01B 11/12<br>174/102 R |
| 10,269,468 | B1 | 4/2019 | Huang et al. | |
| 2015/0195961 | A1 | 7/2015 | Yanagihara et al. | |
| 2019/0164667 | A1 * | 5/2019 | Huang | H01B 11/1033 |
| 2020/0168354 | A1 * | 5/2020 | Kim | H01B 1/023 |

FOREIGN PATENT DOCUMENTS

| | | | |
|---|---|---|---|
| JP | 2014-071974 | A | 4/2014 |
| JP | 2019-096567 | A | 6/2019 |

* cited by examiner

CABLE

CROSS-REFERENCE TO RELATED APPLICATION

The present application is based on Japanese patent application No. 2020-154344 filed on Sep. 15, 2020, the entire contents of which are incorporated herein by reference.

BACKGROUND OF THE INVENTION

1. Field of the Invention

The present invention relates to a cable.

2. Description of the Related Art

In order to enhance productivity in a factory or the like, the widespread use of industrial robots such as cooperative robots or small articulated robots or the like is expanding. As a cable being used for the industrial robots, a movable part cable to be wired in a movable part of the industrial robot and a fixed part cable for connecting between the industrial robot and a control device or the like have been known. As an example of a cable being used as the fixed part cable, a cable including a shield layer around a cable core so as to suppress an external noise in factories and the like has been used. As the shield layer, a braided shield formed by braiding metal wires made of copper or copper alloy has been widely used.

The patent document 1 is a prior art document relating to the invention of the present application.

Patent Document 1: JP2014-071974A

SUMMARY OF THE INVENTION

A cable length of the cable used as the fixed part cable becomes lengthy (e.g., approximately 25 m to 50 m) so as to connect between the industrial robot and control device etc., in the factory and the like. In recent years, the number of electric wires included in a cable increases e.g., not less than 40, and a cable outer diameter often increases e.g., not less than 20 mm.

Thus, the cable including a braided shield formed by braiding metal wires made of copper or copper alloy as a shield layer may be extremely heavy (for example, approximately 30% of a total copper amount in the cable may be a copper amount of the shield layer). Therefore, a load applied to an operator who performs a wiring operation or transportation of the cable may increase, and a further care should be taken to ensure the safety in operation.

Further, in the cable including the braided shield formed by braiding metal wires made of copper or copper alloy as the shield layer, since rigidity of the shield layer (restoring force to recover a straight shape when the cable is bent) is high, the cable would be hardly bent in a small bending radius. Thus, for example, it is hard to wire the cable with being bent in a desired shape based on a wiring space in the wiring operation of the cable, or it is hard to transport the cable while the cable is received compactly in a housing case and the like, so that the handling property of the cable may be decreased.

For solving the above problems, for example, it may be considered to use a braided shield formed by braiding metal wires made of aluminum or aluminum alloy as the shield layer. In this case, although the weight of the cable will be lighter, abrasion of the metal wires due to the friction between metal wires will be easily caused in bending the cable, and the disconnection (breakage) of the metal wires may easily occur. If the metal wire constituting the shield layer is broken, the function as the shield layer will be deteriorated.

Therefore, it is an object of the invention to provide a cable which can be reduced in weight and easily wired and in which metal wires constituting a shield layer will not be easily broken when the cable is bent.

According to an embodiment of the invention, a cable, comprises:

a cable core comprising one or more electric wires;

a shield layer covering around the cable core; and a sheath covering around the shield layer, wherein the shield layer comprises a braided shield including a plurality of first metal wires comprising aluminum or aluminum alloy, and a plurality of second metal wires comprising copper or copper alloy, wherein the plurality of first metal wires and the plurality of second metal wires are cross-braided.

Advantageous Effects of Invention

According to the present invention, it is possible to provide a cable which can be reduced in weight and easily wired and in which metal wires constituting a shield layer will not be easily broken when the cable is bent.

BRIEF DESCRIPTION OF THE DRAWINGS

Next, preferred embodiment according to the present invention will be described with reference to appended drawings, wherein.

DETAILED DESCRIPTION OF THE PREFERRED EMBODIMENT

Embodiment

An embodiment of the present invention will be explained in conjunction with appended drawings.

Figure 1A:
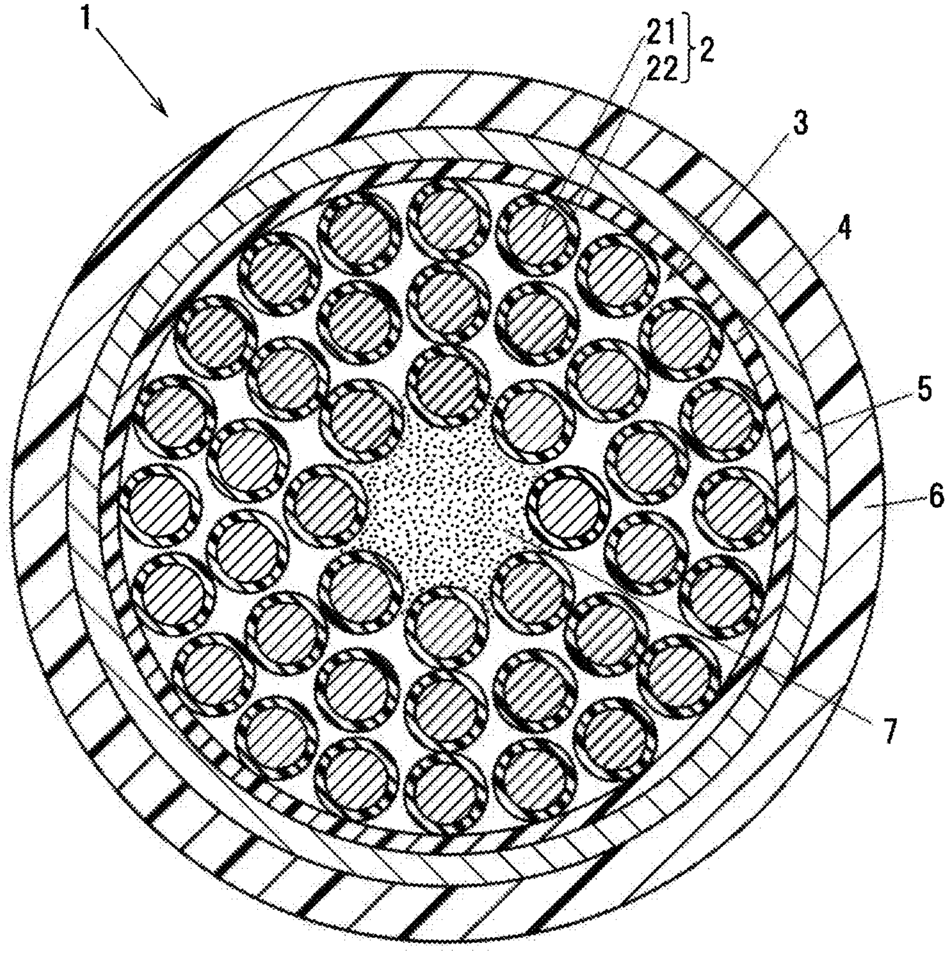
FIG. 1A is a cross-sectional vies showing a cross-section perpendicular to a cable longitudinal direction of a cable according to an embodiment of the present invention.
Figure 1B:
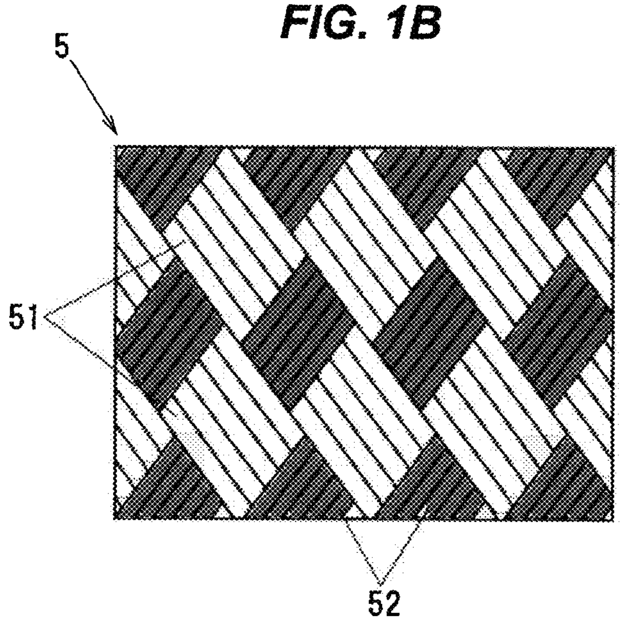
FIG. 1B is a schematic diagram showing a shield layer.

FIG. 1A is a cross-sectional vies showing a cross-section perpendicular to a cable longitudinal direction of a cable according to an embodiment of the present invention. FIG. 1B is a schematic diagram showing a shield layer. A cable 1 is, for example, used as a fixed part cable for connecting between an industrial robot and a control device or the like in factories and the like.

As shown in FIGS. 1A and 1B, the cable 1 comprises a cable core 3 comprising one or more electric wires 2, a shield layer 5 covering around the cable core 3, and a sheath 6 covering around the shield layer 5.

The electric wire 2 comprises a conductor 21, and an insulator 22 covers around the conductor 21. The conductor 21 is composed of a stranded conductor formed by twisting a plurality of metal wires together. In the present embodiment, the conductor 21 is formed by collectively twisting thirty-seven (37) metal wires composed of tin-plated annealed copper (soft copper) wires each having an outer diameter of 0.26 mm. For example, a twist pitch of the conductor 21 is 29 mm or more and 40 mm or less. In addition, an outer diameter of the conductor 21 is approximately 1.8 mm, and a conductor size of the conductor 21 is 15 AWG. In the meantime, although the outer diameter and the conductor size of the conductor 21 are not limited thereto. It is preferable that each of the electric wires 2 has the same outer diameter and the same conductor size of the conductor 21.

For the insulator 22, polyvinylchloride resin compound is used. A thickness of the insulator 22 is e.g., 0.5 mm or more and 0.7 mm or less. An outer diameter of the insulator 22 (an outer diameter of the electric wire 2) is e.g., 2.9 mm or more and 3.1 mm or less.

The cable core 3 is formed by spirally twisting the plurality of electric wires 2 around a center filler 7 arranged at a cable center. In the present embodiment, for example, as shown in FIG. 1A, the cable core 3 may be formed by twisting the electric wires 2 in three layers, in which eight (8) electric wires are twisted around the center filler 7 to provide a first layer, fourteen (14) electric wires are twisted around the first layer to provide a second layer, and twenty (20) electric wires are twisted around the second layer to provide a third layer. In this case, the number of the electric wires 2 constituting the cable core 3 is forty-two (42) in total. The electric wires 2 of each layer are twisted in the same direction. An outer diameter of the cable core 3 is approximately 22 mm to 23 mm. In addition, although the number of the electric wires 2 constituting the cable core 3 is forty-two (42) in this embodiment, the number of the electric wires 2 constituting the cable core 3 is not limited thereto. It will be enough if the number of the electric wires 2 is one or more. When the cable core 3 is formed from one electric wire 2 (without the center filler 7) arranged at the cable center, the cable 1 is a coaxial cable.

The center filler 7 is formed by bundling a plurality of fibrous members (threads, filaments). In the present embodiment, the center filler is formed by bundling fifty (50) spun rayon yarns of number 10 (10s/1). In the meantime, a material and the number of the threads constituting the center filler 7 is not limited thereto. The center filler 7 is arranged at the cable center, and is not arranged between the electric wires 2, 2 in each layer or between the electric wire 2 and a binder tape 4. The center filler 7 is arranged to enter into a space between the electric wires 2, 2constituting the first layer (i.e., between two electric wires 2, 2 adjacent to each other in a circumferential direction) of the cable core 3.

The binder tape 4 is spirally wrapped around the cable core 3. The binder tape 4 serves as a member for maintaining the twist of cable core 3 not to loosen. The binder tape 4 is spirally wrapped around the cable core 3 in such a manner that side edges in its width direction will partially overlap. A winding direction of the binder tape 4 is the same direction as the twist direction of the cable core 3. The winding direction of the binder tape 4 is a rotational direction of the binder tape 4 from the other end of the cable 1 to one end of the cable 1. In addition, the twist direction of the cable core 3 is a rotational direction of the electric wire 2 from the other end of the cable 1 to one end of the cable 1. As the binder tape 4, a tape made of paper or non-woven fabric or a resin tape made of resin such as polyethylene may be used. It should be noted that the binder tape 4 is not an essential element. For example, the binder tape 4 for maintaining the twist of the cable core 3 can be omitted when the cable core 3 is composed of a single electric wire 2.

The shield layer 5 is provided to cover around the binder tape 4. The detail of the shield layer 5 will be described later.

The sheath 6 is configured to protect the shield layer 5 or the cable core 3, and provided to cover around the shield layer 5. In the present embodiment, the sheath 6 composed of polyvinylchloride resin compound is used. A thickness of the sheath 6 is 1.1 mm or more and 1.3 mm or less. An outer diameter of the sheath 6 (the outer diameter of the cable 1) is approximately 26 mm.

(Shield Layer 5)

As shown in FIG. 1B, in the cable 1 according to the present embodiment, the shield layer 5 is composed of a braided shield including a plurality of first metal wires 51 made of aluminum or aluminum alloy and a plurality of second metal wires 52 made of copper or copper alloy, and the plurality of first metal wires 51 and the plurality of second metal wires 52 are cross-braided, i.e., braided to cross with each other.

According to this configuration, the shield layer 5 can be reduced in weight as compared to a braided shield consisting of metal wires composed of copper or copper alloy.

In addition, the shield layer 5 includes the first metal wires 51 made of aluminum or aluminum alloy having low tensile stress, so that the shield layer 5 is softened and the cable 1 can be easily bent. Further, in the shield layer 5, the disconnection of the metal wires caused by the friction between the metal wires in bending the cable 1 hardly occurs, as compared to a braided shield consisting of metal wires composed of aluminum or aluminum alloy. It is because that the braided shield formed by braiding the first metal wires 51 made of aluminum or aluminum alloy and the second metal wires 52 made of copper or copper alloy can slide easier and the abrasion hardly occurs even though there is a friction between the metal wires, as compared to a braided shield formed by braiding metal wires made of aluminum or aluminum alloy.

In addition, when connecting a terminal of the cable 1 to a substrate and the like, it is hard to perform bonding of the braided shield consisting of the metal wires made of aluminum or aluminum alloy by soldering. Meanwhile, in the present embodiment, since the shield layer 5 further includes the second metal wires 52 made of copper or copper alloy, it is possible to easily perform the bonding by soldering.

Further, in terminal processing of the cable 1, the shield layer 5 may be exposed at the terminal of the cable 1, the exposed shield layer 5 (the braided shield) may be unfolded by using a specialized tool or the like, and then the unfolded metal wires 51, 52 may be bunched to be divided from the cable core 3 and connected to the substrate and the like. In this case, the shield layer 5 is connected to the substrate or the like by connecting the bunched metal wires 51, 52 by crimping or soldering. In the present embodiment, since the shield layer 5 includes the first metal wire 51 made of aluminum or aluminum alloy having low tensile stress, it is possible to unfold the shield layer 5 easier than the braided shield consisting of copper wires. In addition, since the first metal wire 51 serves to maintain a shape when bunching unfolded metal wires 51, 52, it is easy to bunch the metal wires 51, 52 in a desired shape. In addition, it is possible to easily perform the solder bonding by bunching the metal wires 51, 52 in such a manner that the second metal wires 52 are spirally wound around the first metal wires 51 as a center when bunching the metal wires 51, 52.

In the present embodiment, as the first metal wire 51 made of aluminum, e.g., an aluminum wire made of pure aluminum may be used. As the first metal wire 51 made of aluminum alloy, an aluminum alloy wire including at least one of metal elements such as magnesium, iron, zirconium, nickel, manganese, zinc, cobalt, and titan at a predetermined amount may be used. As the second metal wire 52 made of copper, a tin-plated annealed copper (soft copper) wire composed of an annealed copper wire plated with tin on its surface may be used. As the second metal wire 52 made of copper alloy, a copper alloy wire including at least one of metal elements such as magnesium, tin, indium, silver, nickel, manganese, and zinc at a predetermined amount may be used. The annealed copper wire may be composed of tough pitch copper, oxygen-free copper, and the like. In addition, in the present embodiment, it is preferable to apply liquid paraffin as lubricant on a surface of the second metal wire 52 (e.g., a surface of the tin-plated annealed copper wire) to further suppress the disconnection of the metal wires caused by the friction between the metal wires.

Further, in the present embodiment, a cross-sectional area of the first metal wire 51 made of aluminum or aluminum alloy (e.g., the pure aluminum wire) is greater than a cross-sectional area of the second metal wire 52 made of copper or copper alloy (e.g., the tin-plated annealed copper wire). According to this configuration, it is possible to form a space between the first metal wires 51 and the second metal wires 52 at a cross position of both the metal wires 51, 52. And thus it is possible to further suppress the disconnection caused by the friction between the metal wires in bending the cable 1. In addition, it is possible to easily visually distinguish the first metal wire 51 and the second metal wire 52 from each other based on a difference in outer diameters by enlarging the cross-sectional area of the first metal wire 51 than that of the second metal wire 52. As a result, it is possible to easily visualize a border (a level difference) between the first metal wire 51 and the second metal wire 52 in the terminal processing. It is possible to easily unfold the braided shield by inserting tools or the like into the border (level difference). The cross-sectional area of the first metal wire 51 is an area of a cross-section perpendicular to a longitudinal direction of the first metal wire 51. The cross-sectional area of the second metal wire 52 is an area of a cross-section perpendicular to a longitudinal direction of the second metal wire 52.

More specifically, in a cross-sectional view perpendicular to the cable longitudinal direction, the cross-sectional area of the first metal wire 51 is 1.5 times or more and 2.0 times or less the cross-sectional area of the second metal wire 52. By setting the cross-sectional area of the first metal wire 51 to be 1.5 times or more the cross-sectional area of the second metal wire 52, it is possible to suppress the increase in resistance in the shield layer 5, thereby suppress the deterioration in shield effect, even though the first metal wire 51 made of aluminum (or aluminum alloy) having an electrical conductivity lower than copper is used. Further, by setting the cross-sectional area of the first metal wire 51 to be 2.0 times or less the cross-sectional area of the second metal wire 52, it is possible to suppress an excessive increase in outer diameter difference between the metal wires 51, 52, and to suppress undulation or distortion in the braided shield caused by an excessive increase in length difference between the metal wires 51, 52 in manufacturing the braided shield. If the braided shield is undulated or distorted, an undulated or distorted portion will be easily damaged in manufacturing process, and the disconnection may be caused. By setting the cross-sectional area of the first metal wire 51 to be 2.0 times or less the cross-sectional area of the second metal wire 52, it is possible to suppress the damage in such manufacturing process. In the present embodiment, for example, a tin-plated annealed copper wire having an outer diameter of 0.12 mm (having a cross-sectional area of approximately 0.011 $mm^2$) may be used as the second metal wire 52, and a pure aluminum wire having an outer diameter of 0.15 mm or more and 0.17 mm or less (having a cross-sectional area of approximately 0.018 $mm^2$ or more and 0.023 $mm^2$ or less) may be used as the first metal wire 51.

As the first metal wire 51 and the second metal wire 52, it is preferable to use a soft material that can be easily bent. More specifically, the first metal wire 51 preferably has tensile strength of 90 MPa or more, elongation of 10% or more, and electrical conductivity of 60% or more. In addition, the second metal wire 52 preferably has tensile strength of 200 MPa or more, elongation of 10% or more, and electrical conductivity of 98% or more. According to this configuration, it is possible to suppress the disconnection in the metal wires 51, 52 caused by tensile stress in bending the cable 1 and to maintain easiness of bending the cable 1.

For example, the number of spindles (carriers) for the braided shield constituting the shield layer 5 is 16 or 24. When the number of spindles for the braided shield is 16, 8 spindles are assigned to only the first metal wires 51 and other 8 spindles are assigned to only the second metal wires 52. The number of spindles for the first metal wires 51 is equal to the number of spindles for the second metal wires 52. That is, the number of the first metal wires 51 used in the shield layer 5 is equal to the number of the second metal wires 52 used in the shield layer 5.

Since the numbers of the first metal wires 51 and the second metal wires 52 are equal, and the cross-sectional area of each first metal wire 51 is greater than the cross-sectional area of each second metal wire 52, an area ratio of a total cross-sectional area of the first metal wires 51 to a total cross-sectional area of the shield layer 5 is greater than an area ratio of a total cross-sectional area of the second metal wires 52 to the total cross-sectional area of the shield layer 5. More specifically, the area ratio of the total cross-sectional area of the first metal wires 51 to the total cross-sectional area of the shield layer 5 is preferably 55% or more and 65% or less in the cross-sectional view perpendicular to the cable longitudinal direction. Similarly, the area ratio of the total cross-sectional area of the second metal wires 52 to the total cross-sectional area of the shield layer 5 in the cross-sectional view perpendicular to the cable longitudinal direction is preferably 35% or more and 45% or less. In other words, a ratio of the total cross-sectional area S1 which is a sum of respective cross-sectional areas of the first metal wires 51 to the total cross-sectional area S2 which is a sum of respective cross-sectional areas of the second metal wires 52 (S1/S2) in the cross-sectional view perpendicular to the cable longitudinal direction is preferably 1.22 (55/45) or more and 1.86 (65/35) or less. According to this configuration, an entire shield layer 5 becomes softer and the cable 1 can be bent easily. In addition, it is easy to maintain the shape of the shield layer 5 when the shield layer 5 is molded into a desired shape. Further, it is possible to easily perform the terminal processing.

Effects of the Embodiment

As described above, in the cable 1 according to the present embodiment, the shield layer 5 comprises a braided shield including the plurality of first metal wires 51 comprising aluminum or aluminum alloy, and the plurality of second metal wires 52 comprising copper or copper alloy, and the first metal wires 51 and the second metal wires 52 are cross-braided. By providing the shield layer 5 as described above, it is possible to provide the cable 1 which can be reduced in weight and easily wired and in which the metal wires constituting the shield layer 5 will not be easily broken when the cable 1 is bent.

Summary of the Embodiment

Next, the technical concept grasped from the above-described embodiment is described with reference to the signs or the like in the embodiment. However, each sign or the like in the following description is not limited to a member or the like specifically showing the elements in the following claims in the embodiment.

[1] A cable (1), comprising:

a cable core (3) comprising one or more electric wires (2);

a shield layer (5) covering around the cable core (3); and a sheath (6) covering around the shield layer (5), wherein the shield layer (5) comprises a braided shield including a plurality of first metal wires (51) comprising aluminum or aluminum alloy, and a plurality of second metal wires (52) comprising copper or copper alloy, wherein the plurality of first metal wires (51) and the plurality of second metal wires (52) are cross-braided.

[2] The cable (1) according to [1], wherein a cross-sectional area of the first metal wire (51) is greater than a cross-sectional area of the second metal wire (52).

[3] The cable (1) according to [2], wherein the cross-sectional area of the first metal wire (51) is 1.5 times or more and 2.0 times or less the cross-sectional area of the second metal wire (52).

[4] The cable (1) according to any one of [1] to [3], wherein a ratio of a total cross-sectional area of the first metal wires (51) to a cross-sectional area of the shield layer (5) is greater than a ratio of a total cross-sectional area of the second metal wires (52) to the cross-sectional area of the shield layer (5).

[5] The cable (1) according to any one of [1] to [4], wherein the first metal wire (51) comprises a soft material, and has a tensile strength of 90 MPa or more, an elongation of 10% or more, and an electrical conductivity of 60% or more.

[6] The cable (1) according to any one of [1] to [5], wherein the second metal wire (52) comprises a soft material, and has a tensile strength of 200 MPa or more, an elongation of 10% or more, and an electrical conductivity of 98% or more.

Although the embodiments of the invention have been described, the invention according to claims is not to be limited to the embodiments. In addition, please note that all combinations of the features described in the embodiments are not necessary to solve the problem of the invention. Furthermore, the various kinds of modifications can be implemented without departing from the gist of the invention.

What is claimed is:

1. A cable, comprising:

a cable core comprising one or more electric wires, each comprising a conductor and an insulator covering around the conductor;

a sheath covering around the cable core; and a double-layer structure intervening layer provided between the cable core and the sheath, and comprising a first intervening layer and a second intervening layer, wherein the first intervening layer covers the cable core and is in contact with the cable core, and comprises a binder tape layer composed of a paper tape, a non-woven fabric tape, or a resin tape, wherein the second intervening layer covers the first intervening layer and is in contact with the first intervening layer, and comprises a shield layer, wherein the shield layer comprises a braided shield including first metal wires comprising aluminum or aluminum alloy, and second metal wires comprising copper or copper alloy, wherein the first metal wires and the second metal wires are cross-braided, wherein a cross-sectional area of each of the first metal wires is 1.5 times or more and 2.0 times or less a cross-sectional area of each of the second metal wires, and wherein a ratio of a total cross-sectional area of the first metal wires to a total cross-sectional area of the second metal wires in the cross-sectional view perpendicular to the cable longitudinal direction is 1.22 or more and 1.86 or less.

2. The cable according to claim 1, wherein each of the second metal wires comprises a tensile strength of 200 MPa or more, an elongation of 10% or more, and an electrical conductivity of 98% or more.

3. The cable according to claim 1, wherein a space is provided between the first metal wires and the second metal wires at a cross position of the first metal wires and the second metal wires.

4. The cable according to claim 1, wherein each of the first metal wires has a tensile strength of 90 MPa or more, an elongation of 10% or more, and an electrical conductivity of 60% or more.

5. The cable according to claim 1, wherein a ratio of the total cross-sectional area of the first metal wires to a total cross-sectional area of the shield layer comprises 55% or more and 65% or less in the cross-sectional view perpendicular to the cable longitudinal direction.

6. The cable according to claim 1, wherein a ratio of the total cross-sectional area of the second metal wires to a total cross-sectional area of the shield layer in the cross-sectional view perpendicular to the cable longitudinal direction is 35% or more and 45% or less.

7. The cable according to claim 1, wherein the electric wires are arranged in three layers, wherein a first layer of the three layers is twisted around a center filler, a second layer of the three layers is twisted around the first layer, and a third layer of the three layers is twisted around the second layer.

8. The cable according to claim 1, comprising a configuration of a center filler at a cable center in which the electric wires are twisted.

9. The cable according to claim 1, wherein numbers of the first metal wires and the second metal wires are equal to each other, wherein a ratio of the total cross-sectional area of the first metal wires to a total cross-sectional area of the shield layer is greater than a ratio of the total cross-sectional area of the second metal wires to the total cross-sectional area of the shield layer, and wherein a space is formed between the first metal wires and the second metal wires at cross-sections of the first and second metal wires.

10. A cable, comprising:

a cable core comprising a plurality of electric wires, each comprising a conductor and an insulator covering around the conductor;

a sheath covering around the cable core; and a double-layer structure intervening layer provided between the cable core and the sheath, and comprising a first intervening layer and a second intervening layer, wherein the first intervening layer covers the cable core and is in contact with the cable core, and comprises a binder tape layer composed of a paper tape, a non-woven fabric tape, or a resin tape, wherein the second intervening layer covers the first intervening layer and is in contact with the first intervening layer, and comprises a shield layer, wherein the shield layer comprises a braided shield including first metal wires comprising one of aluminum and an aluminum alloy, and second metal wires comprising one of copper and a copper alloy, wherein the first metal wires and the second metal wires are cross-braided, wherein a cross-sectional area of each of the first metal wires is 1.5 times or more and 2.0 times or less the cross-sectional area of each of the second metal wires, and wherein a ratio of a total cross-sectional area of the first metal wires to a total cross-sectional area of the second metal wires in the cross-sectional view perpendicular to the cable longitudinal direction is 1.22 or more and 1.86 or less.

11. The cable according to claim 10, wherein a number of the first metal wires and a number of the second metal wires are equal to each other, wherein the plurality of electric wires are spirally wound around a center filler arranged at a cable center, wherein the cable core comprises the plurality of electric wires arranged in three layers, wherein a first layer of the three layers is twisted around the center filler, a second layer of the three layers is twisted around the first layer, and a third layer of the three layers is twisted around the second layer, and wherein a number of electric wires of said first layer is less than a number of electric wires of said second layer, and a number of electric wires of said third layer is greater than said number of electric wires of said second layer.

12. The cable according to claim 10, wherein a space is provided between the first metal wires and the second metal wires at a cross position of the first metal wires and the second metal wires.

13. The cable according to claim 10, wherein each of the first metal wires has a tensile strength of 90 MPa or more, an elongation of 10% or more, and an electrical conductivity of 60% or more.

14. The cable according to claim 10, wherein a ratio of the total cross-sectional area of the first metal wires to a total cross-sectional area of the shield layer is greater than a ratio of the total cross-sectional area of the second metal wires to the total cross-sectional area of the shield layer.

15. The cable according to claim 14, wherein the ratio of the total cross-sectional area of the first metal wires to the total cross-sectional area of the shield layer comprises 55% or more and 65% or less in the cross-sectional view perpendicular to the cable longitudinal direction.

16. The cable according to claim 14, wherein the ratio of the total cross-sectional area of the second metal wires to the total cross-sectional area of the shield layer in the cross-sectional view perpendicular to the cable longitudinal direction is 35% or more and 45% or less.

* * * * *